(12) United States Patent
Deuker

(10) Patent No.: US 7,331,219 B2
(45) Date of Patent: Feb. 19, 2008

(54) METHOD FOR DETERMINING FLUCTUATING FUEL PROPERTIES DURING THE OPERATION OF A POWER PLANT

(75) Inventor: Eberhard Deuker, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/580,996

(22) PCT Filed: Nov. 22, 2004

(86) PCT No.: PCT/EP2004/053039

§ 371 (c)(1),
(2), (4) Date: May 26, 2006

(87) PCT Pub. No.: WO2005/052450

PCT Pub. Date: Sep. 6, 2005

(65) Prior Publication Data

US 2007/0113631 A1 May 24, 2007

(30) Foreign Application Priority Data

Nov. 27, 2003 (EP) .................. 03027392

(51) Int. Cl.
*G01L 3/26* (2006.01)
(52) U.S. Cl. ...................... 73/112
(58) Field of Classification Search ................ 73/1.02, 73/1.06, 19.01, 19.1, 19.11, 23.2, 112, 113, 73/116, 117.2, 117.3, 118.1, 119 A
See application file for complete search history.

(56) References Cited

U.S. PATENT DOCUMENTS

| 4,659,306 A | 4/1987 | Altemark et al. |
| 4,671,106 A * | 6/1987 | Schroeder ................ 73/117.3 |
| 5,486,107 A | 1/1996 | Bonne |

FOREIGN PATENT DOCUMENTS

| EP | 1 118 857 A2 | 7/2001 |
| JP | 57070321 A | 4/1982 |

* cited by examiner

*Primary Examiner*—Eric S. McCall

(57) ABSTRACT

The invention relates to a method for detecting fluctuating fuel properties during the operation of a power plant. According to the inventive method, the actual operating characteristics of the power plant are used to determine the efficiency of the power plant and a change in fuel properties is concluded from a temporal change in the efficiency so determined.

11 Claims, 2 Drawing Sheets

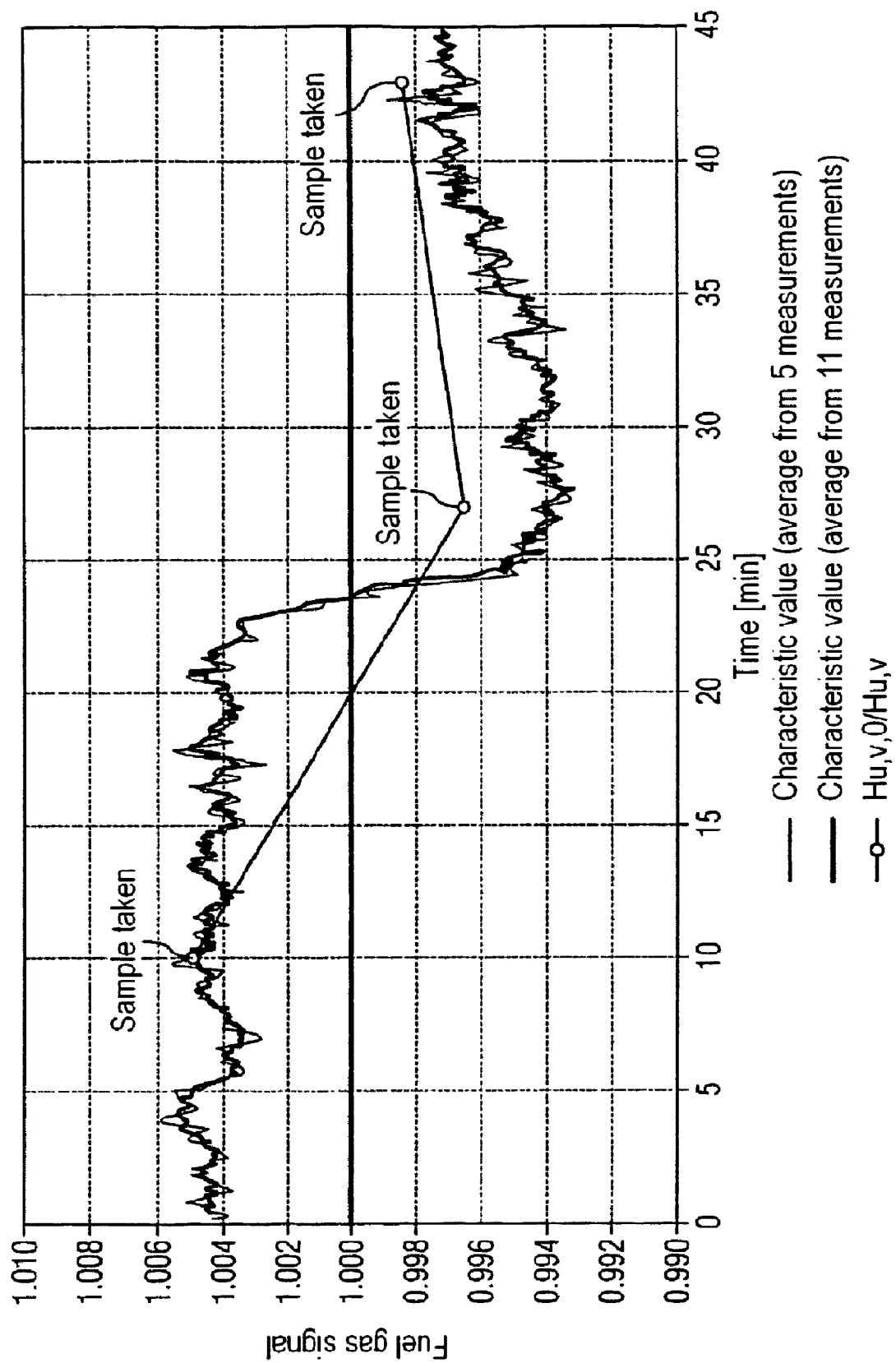

US 7,331,219 B2

METHOD FOR DETERMINING FLUCTUATING FUEL PROPERTIES DURING THE OPERATION OF A POWER PLANT

CROSS REFERENCE TO RELATED APPLICATIONS

This application is the US National Stage of International Application No. PCT/EP2004/053039, filed Nov. 22, 2004 and claims the benefit thereof. The International Application claims the benefits of European Patent application No. 03027392.4 filed Nov. 27, 2003. All of the applications are incorporated by reference herein in their entirety.

FIELD OF THE INVENTION

The invention relates to a method for determining fluctuating fuel properties during the operation of a power plant.

BACKGROUND OF THE INVENTION

In modern-day power plants, such as high-temperature gas turbines that are operated with natural gas, for example, the conversion of the fuel is generally geared to a specific fuel composition. With regard to the composition of the fuel, characteristic values such as the Wobbe index, the heating value and/or the standard density are used which must lie within a narrowly specified range in order to ensure reliable operation of the power plant. However, the provisioning of power plants is often organized in such a way that under certain conditions a significant change in the composition of the fuel can occur spontaneously (within a few minutes or even in a matter of seconds). The limits specified for the fuel are then exceeded and in certain circumstances stable operation of the power plant is no longer possible.

Outside of the range specified for the fuel, the combustion in particular can become unstable in the power plant, which can lead, for example, to partial load throw-offs or even to emergency tripping via the protection devices of a gas turbine.

SUMMARY OF THE INVENTION

The object underlying the invention is to provide a method by means of which fluctuating fuel properties can also be determined during the operation of a power plant without significant additional overhead. The fuel properties should be determined as close as possible in time to the deviation so that appropriate countermeasures, such as, for example, an adjustment of a pilot gas quantity, can be taken.

The object is achieved according to the invention by means of a method for determining fluctuating fuel properties during the operation of a power plant wherein an efficiency rating for the power plant is determined on the basis of current operating parameters of the power plant and a change in the fuel properties is concluded as a result of a change over time in the efficiency factor thus determined.

The invention is based on the fundamental idea that the efficiency of modern power plants is essentially independent of a change in the composition of the fuel processed therein. Furthermore, in modern power plants the variables that are necessary for calculating the efficiency are essentially already captured during operation. If a (fictitious or reference) efficiency of the power plant is now calculated for example continuously from the values measured during operation, a change in this calculated efficiency over time can be determined. If the calculated efficiency changes with time, then the fuel properties must have changed and it is possible to specify how great this change is.

The method according to the invention therefore enables changes in the composition of the combustion gas processed therein to be recognized for example on the basis of variables measured during operation which are part of the normal measurement scope of any gas turbine. According to the invention a gas turbine can therefore be operated over a greater range or a greater bandwidth of fuels. In addition, the operation of the gas turbine or, as the case may be, of a power plant is also ensured even if there is a sudden change in the composition of the associated fuel, for the recognition of the change in the fuel or gas properties opens up the possibility of compensating for the effects of the fuel change by means of a change to combustion-related setup parameters (e.g. fuel quantity for pilot burners, combustion chamber temperature, etc.) and thereby ensuring the stable operation of the gas turbine.

In an advantageous development of the method according to the invention, at least one element from the group power rating of the power plant, mass flow of the fuel, volume flow of the fuel, pressure of the fuel, and temperature of the fuel is determined as the current operating parameter.

These current operating parameters can be determined with comparatively little effort during the operation of a power plant and, given appropriate evaluation, lead, as will be described in greater detail below, to a precise determination of changes in the fuel properties.

For the purpose of the inventive determination of the efficiency of the power plant the mass flow of the fuel processed in the power plant is advantageously recorded directly.

Alternatively, the volume flow of the fuel, its pressure and its temperature can be recorded for the purpose of determining the efficiency, in particular while leaving out of consideration the real gas factor in the case of gaseous fuel. In this case the volume flow is advantageously recorded by means of a turbine wheel meter, ultrasound meter or vortex meter. Moreover, the inventive determination of the efficiency of the power plant can advantageously be effected by measurement of differential pressure, as well as pressure and temperature of the fuel, once again in particular while ignoring the real gas factor in the case of gaseous fuel. Differential pressure and pressure of the gaseous fuel can be determined for example at an orifice.

Changes in the most diverse fuel properties can be determined by means of the method according to the invention. A change in the mass-related heating value of the fuel can advantageously be determined, which value represents an important indication of the composition of the fuel, with the result that appropriate corrections in the fuel supply can be made during the operation of the power plant.

Furthermore, a change in the volume-related heating value of the fuel can advantageously be concluded by means of the method according to the invention.

In addition, changes in the Wobbe index of a gaseous fuel can also be determined according to the invention by collating information about the standard density and the volume-related heating value of a gaseous fuel.

With the method according to the invention the change over time in the efficiency factor relative to a reference operating state is also advantageously determined, in addition to which the heating value and/or the standard density of the fuel are determined as reference variables. These reference variables are then set as constants in the subsequent determination of an efficiency factor during operation and a check is made to determine whether this "fictitious"

efficiency changes. Since changes in the fuel properties have virtually no influence on the efficiency rating of a power plant in reality, it is recognized from a change in the "fictitious" efficiency that the heating value and/or the standard density of the fuel must have changed compared with the reference operating state. Moreover, from a calculated discrepancy between the efficiency relative to the reference operating state and the "fictitious" efficiency it is possible to derive how great the change in heating value and standard density is. The cited reference variables can be determined in particular by means of rolling averaging during the operation of the power plant. This determination during ongoing operation can be carried out for example using an online gas chromatograph by means of which the reference variables are measured at a specific time. Furthermore, a plurality of measured values can be captured over a period of, for example, approx. two hours by means of a gas chromatograph of said kind during a stationary operating state and then reference variables can be deduced therefrom by averaging. The inventive change in the fuel properties is advantageously quantified using mathematical methods, the result values of which can then be used for controlling and adjusting correction interventions at the associated power plant. Using mathematical methods of said type it is also possible to evaluate current operating parameters which are determined in, in particular regular, cycles with a cycle time of approximately 0.1 sec to 60 sec, more particularly of approximately 1 sec. In this case average values for the operating parameters can be formed over a number of cycles, for example over approximately 5 or 11 measurement cycles. In order to prevent the results of the method according to the invention for determining fluctuating fuel properties from being influenced by undesirable interference factors, attenuation and/or filter functions should be taken into account during the determination of the efficiency in particular on the basis of current operating parameters of the power plant.

BRIEF DESCRIPTION OF THE DRAWINGS

An exemplary embodiment of a method according to the invention for determining fluctuating fuel properties during the operation of a power plant is explained in more detail below with reference to two attached exemplary schematic illustrations, in which:

FIG. 1 shows a first diagram of a fuel gas signal over time according to an inventive method and FIG. 2 shows a second diagram of a fuel gas signal over time according to the inventive method.

DETAILED DESCRIPTION OF THE INVENTION

Figure 1:
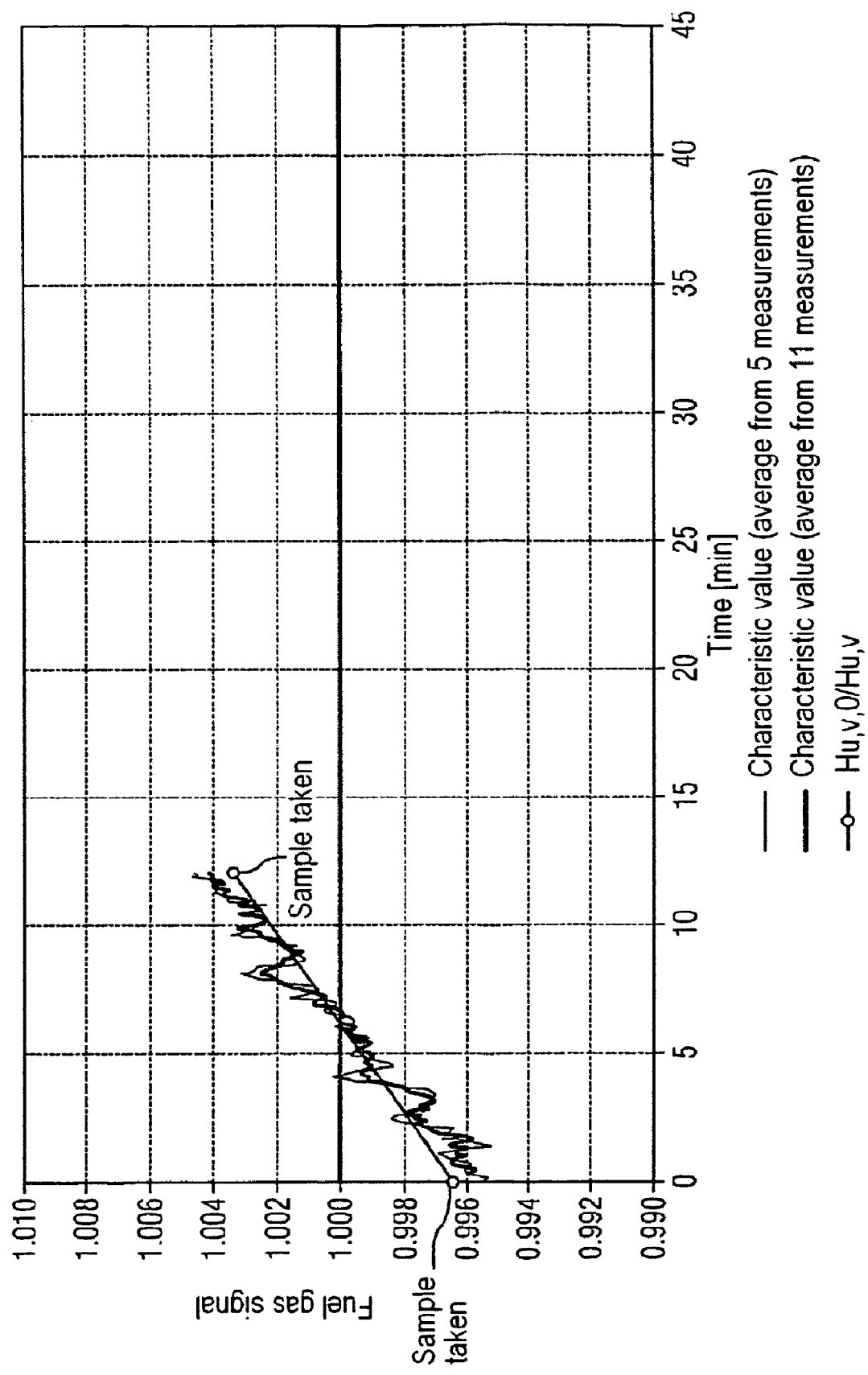

The method according to the invention is explained below with reference to the example of a power plant which is embodied in the form of a high-temperature gas turbine.

The method according to the invention makes use of the fact that in such high-temperature gas turbines the efficiency of a gas turbine is virtually independent of a change in the gas composition. The method also uses the fact that with high-temperature gas turbines of said kind virtually all the operating parameters necessary for calculating the efficiency of the gas turbine are already captured. During the operation of such high-temperature gas turbines, however, the heating value and the standard density of the gas supplied as fuel are usually not monitored continuously. Such monitoring would represent an additional overhead which could not be justified economically.

In contrast to cost-intensive measurements of heating value and standard density, according to the exemplary embodiment of the inventive method explained below changes in the gas properties are determined on the basis of a change in a calculated, as it were "fictitious", efficiency factor.

This "fictitious" efficiency is continuously formed from the values measured during operation, reference values that are constant in time being used for the heating value and the standard density.

If the calculated "fictitious" efficiency now changes with time, then the gas properties, such as heating value and standard density, must have changed, for only by a corresponding adjustment of these values within the calculation of the "fictitious" efficiency is it possible to arrive again at the actual efficiency of the gas turbine, which, as mentioned, is virtually independent of changes in the gas composition and accordingly does not change.

The size of the changes in the fuel properties, in other words the size of the change in heating value and standard density, can also be indicated by the comparison of the "fictitious" efficiency and the unchanged, real efficiency.

The mathematical methods that are used in the change in the fuel properties are explained below.

In the procedure according to the invention the following basic relations are used initially:

$$\eta = \frac{P}{m \cdot Hu_m} \qquad (1)\text{-}(4)$$

$$Hu_v = \rho_N \cdot Hu_m$$

$$m = \rho \cdot V$$

$$\rho = \rho_N \frac{p}{p_N} \frac{T_N}{T} \frac{z_N}{z}$$

i. $\eta$ Efficiency of the gas turbine
ii. P Power
iii. Hu (Lower) heating value of the fuel
   Index V: relative to standard volume
   Index m: relative to mass
iv. m Fuel mass flow
v. V Fuel volume flow
vi. $\rho$ Density of the fuel
vii. p Pressure of the fuel
viii. T Temperature of the fuel
ix. z Real gas factor of the fuel Index N: Standard state The efficiency of a gas turbine on which the method according to the invention is performed is, as mentioned, essentially independent of the fuel properties of the supplied combustion gas. The efficiency is, however, very much dependent on different, easily measurable variables, which are essentially the power of the gas turbine and the ambient temperature. Furthermore the functional relationship between the efficiency and these easily measurable variables is known.

According to the invention a reference state "0" is now introduced at which according to the above cited equation (1) an efficiency of $$\eta_0 = \frac{P_0}{m_0 \cdot Hu_{m,0}} \qquad (5)$$

is produced at a kind of reference operating state.

If this reference operating state is placed in relation to a current operating state, the following equation results:

$$\frac{m \cdot Hu_m}{m_0 \cdot Hu_{m,0}} = \frac{P}{P_0} \frac{\eta_0}{\eta} \quad (6)$$

Within this equation, the fuel mass flow m can now be determined or measured continuously during the operation of the gas turbine and furthermore the power delivered by the gas turbine can also be easily determined.

The fuel mass flow m can be measured in particular according to three different principles:

According to a first principle the mass flow can be measured directly, for example by means of a Coriolis meter.

According to a second principle the mass flow is determined indirectly with the aid of a turbine wheel meter, ultrasound meter or vortex meter by recording operating volume flow, pressure and temperature of the supplied fuel. The mass flow is then calculated according to the formula:

$$m = V \cdot \rho \quad (7)$$
$$= V \cdot \rho_N \frac{p}{p_N} \frac{T_N}{T}$$

With this approach the influence of the real gas factor ($z_N/z$) is ignored, which is to say that it is assumed that this real gas factor changes only insignificantly.

According to a third principle, the differential pressure, the pressure and the temperature of the fuel are measured for example at an aperture. The measured values are then taken into account in the following formula:

$$m = K \cdot \sqrt{\Delta p \cdot \rho} \quad (8)$$
$$= K \cdot \sqrt{\Delta p \cdot \rho_N \frac{p}{p_N} \frac{T_N}{T}}$$

With this approach, too, the influence of the real gas factor is once again ignored ($z_N/z=1$).

Inserting a change in the fuel mass flow determined in such a way into the above cited equation (6) results in the following options for determining changes in the gas properties. In the case of the following equations (9) to (11) the variables to be measured and the (known) function $\eta/\eta_0$ are given on the right side in each case, and the gas property derived therefrom is shown on the left side.

A change in the mass-related heating value results from:

$$\frac{Hu_m}{Hu_{m,0}} = \frac{P}{P_0} \frac{\eta_0}{\eta} \frac{m_0}{m} \quad (9)$$

A change in the volume-related heating value results from:

$$\frac{Hu_v}{Hu_{v,0}} = \frac{P}{P_0} \frac{\eta_0}{\eta} \frac{V_0}{V} \frac{p}{\rho_N} \frac{T_N}{T} \quad (10)$$

In addition, a change in the Wobbe index results from:

$$\sqrt{\frac{\rho_{n,0}}{\rho_N}} \frac{Hu_v}{Hu_{v,0}} = \frac{P}{P_0} \frac{\eta_0}{\eta} \frac{V_0}{V} \sqrt{\frac{\Delta p_0}{\Delta p} \frac{\rho}{\rho_N} \frac{T_N}{T}} \quad (11)$$

The above cited reference state "0" or reference operating state is basically any time during which reliable data about the heating value or the standard density of the supplied combustion gas are known. As an alternative to such a reference state determined at a specific "point", a reference can be determined for example by a kind of rolling averaging over a period of approximately 2 hours during a stationary operating state of the gas turbine. In this case updated fuel properties are recorded and averaged e.g. on the basis of values from an online gas chromatograph.

Furthermore the operational measured variables used in the above listed equations can be subjected to suitable attenuation or filter functions so that natural fluctuations in these operational measured variables do not lead to an undesirable distortion during the determination of the fuel properties.

The operational measured variables are advantageously captured using a cycle time of approx. 1 sec or even shorter, as a result of which changes in the fuel properties can be detected practically in real time.

Evaluations of the method according to the invention for determining fluctuating fuel properties have shown that with this method even heating value or density changes of as little as 1% can be clearly detected. The accompanying diagrams show results of such investigations in which the volume flow of the fuel has been continuously determined in particular by means of a turbine wheel meter. A measurement cycle of approx. 5 sec and a rolling averaging over 5 and 11 values (see thin curve and thick curve, respectively) was used for the measurements. In addition samples were taken at the times marked and analyzed in a gas chromatograph (see point values in the diagrams).

The fuel gas signals or characteristic values shown represent the heating value of the fuel relative to standard volumes during the reference operating state in relation to the heating value of the fuel relative to standard volumes at the time of determination ($Hu_{v,0}/Hu_v$). Accordingly, the characteristic values correspond to the inverse value of the left side of the above cited equation (10).

The reference values (index 0) are the average values over the respective test period. The results from the analysis of the samples taken confirm the trend of the characteristic value curve and show that the change in the heating values is detected with a precision in the order of a few per mil.

The invention claimed is:

1. A method for determining a fluctuation of fuel properties (Hu, ρ) of an operating power plant, comprising:
   determining an efficiency factor ($\eta$) for the power plant based on current operating parameters (P, m, V, p, T) of the power plant;
   determining heating value ($Hu_0$) and the standard density ($\rho_0$) of the fuel as reference variables by a rolling averaging during the operation of the power plant;
   determining an efficiency factor ($\eta$) relative to a reference operating state as a function of time;
   determining that a change in the fuel properties has occurred based on a change over time in the efficiency factor ($\eta$); and upon having determined the change in the fuel properties, adjusting at least one combustion-related parameter of the power plant to provide stable operation of the power plant notwithstanding the change in fuel properties.

2. The method as claimed in claim 1, wherein the current operating parameters (P, m, V, p, T) are selected from the group consisting of: power rating (P) of the power plant, mass flow (m) of the fuel, volume flow (V) of the fuel, pressure (p) of the fuel, and temperature (T) of the fuel.

3. The method as claimed in claim 2, wherein the efficiency ($\eta$) is determined by direct recording of the mass flow (m) of the fuel.

4. The method as claimed in claim 2, wherein the efficiency is determined by recording the volume flow (V), the pressure (p) and the temperature (T) of the fuel.

5. The method as claimed in claim 4, wherein the efficiency is determined while not considering a real gas factor (z).

6. The method as claimed in claim 2, wherein the efficiency is determined by measuring differential pressure ($\Delta p$), pressure (p) and temperature (T) of the fuel.

7. The method as claimed in claim 6, wherein the efficiency is determined while not considering a real gas factor (z).

8. The method as claimed in claim 7, wherein a change in a mass-related heating value ($Hu_m$) of the fuel is concluded as a change in the fuel property (Hu, $\rho$).

9. The method as claimed in claim 8, wherein a change in a volume-related heating value ($Hu_v$) of the fuel is determined as a change in the fuel property (Hu, $\rho$).

10. The method as claimed in claim 9, wherein a change in a Wobbe index $$\left( \sqrt{\frac{\rho_{N,0}}{\rho_N}} \frac{Hu_V}{Hu_{V,0}} \right)$$

is determined as a change in the fuel property (Hu, $\rho$).

11. The method as claimed in claim 10, wherein a change of at least 1% in the fuel properties (Hu, $\rho$) can be determined.

* * * * *